(12) United States Patent
Hou et al.

(10) Patent No.: US 11,176,086 B2
(45) Date of Patent: Nov. 16, 2021

(54) PARALLEL COPYING DATABASE TRANSACTION PROCESSING

(71) Applicant: Huawei Technologies Co., Ltd., Shenzhen (CN)

(72) Inventors: Jie Hou, Beijing (CN); Chengyong Lin, Shenzhen (CN); Yan Li, Shenzhen (CN); Longfei Dai, Beijing (CN); Wenxia Dong, Beijing (CN); Yuezhong Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 16/456,748

(22) Filed: Jun. 28, 2019

(65) Prior Publication Data

US 2019/0324760 A1 Oct. 24, 2019

Related U.S. Application Data

(63) Continuation of application No. PCT/CN2016/113981, filed on Dec. 30, 2016.

(51) Int. Cl.
*G06F 16/22* (2019.01)
*G06F 16/00* (2019.01)
(Continued)

(52) U.S. Cl.
CPC .............. *G06F 16/00* (2019.01); *G06F 9/28* (2013.01); *G06F 9/30145* (2013.01);
(Continued)

(58) Field of Classification Search
CPC ... G06F 16/2246; G06F 3/065; G06F 16/9027
See application file for complete search history.

(56) References Cited

U.S. PATENT DOCUMENTS 8,768,977 B2 * 7/2014 Golab ..................... G06F 16/27
 707/806
10,838,944 B2 * 11/2020 Mackovitch ............ G06F 16/23
(Continued)

FOREIGN PATENT DOCUMENTS

CN 1567237 A 1/2005
CN 101494591 A 7/2009
(Continued)

OTHER PUBLICATIONS

Machine Translation and Abstract of Chinese Publication No. CN102867059, Jan. 9, 2013, 13 pages.
(Continued)

*Primary Examiner* — Mariela Reyes
*Assistant Examiner* — Anna Lao
(74) *Attorney, Agent, or Firm* — Conley Rose, P.C.

(57) ABSTRACT

A network device obtains, from a transaction queue, a plurality of transactions that do not conflict with each other, and performs reverse shallow copying in parallel for the transactions that do not conflict, to generate a plurality of temporary trees corresponding to the plurality of transactions. Because the plurality of transactions does not conflict with each other, processing the transactions in parallel can ensure accurate and proper transaction processing. In addition, generating the temporary trees in a reverse shallow copying manner can effectively reduce consumption of time and memory. Further, processing of the plurality of transactions is implemented by merging the plurality of temporary trees.

20 Claims, 9 Drawing Sheets

(51) Int. Cl.
*G06F 9/28* (2006.01)
*G06F 9/30* (2018.01)
*G06F 9/38* (2018.01)
*G06F 16/901* (2019.01)
*G06F 16/23* (2019.01)

(52) U.S. Cl.
CPC .......... *G06F 9/3822* (2013.01); *G06F 9/3887* (2013.01); *G06F 16/2246* (2019.01); *G06F 16/2308* (2019.01); *G06F 16/9027* (2019.01)

(56) References Cited

U.S. PATENT DOCUMENTS

| | | | |
|---|---|---|---|
| 2008/0208560 | A1 | 8/2008 | Johnson et al. |
| 2012/0011106 | A1 | 1/2012 | Reid et al. |
| 2012/0110433 | A1* | 5/2012 | Pan ...................... G06F 40/103 715/234 |
| 2016/0191625 | A1 | 6/2016 | Magdon-Ismail et al. |

FOREIGN PATENT DOCUMENTS

| | | |
|---|---|---|
| CN | 101627394 A | 1/2010 |
| CN | 102867059 A | 1/2013 |
| CN | 104679484 A | 6/2015 |
| CN | 104794196 A | 7/2015 |
| CN | 105159915 A | 12/2015 |
| EP | 1315329 A2 | 5/2003 |

OTHER PUBLICATIONS

Machine Translation and Abstract of Chinese Publication No. CN104679484, Jun. 3, 2015, 61 pages.
Machine Translation and Abstract of Chinese Publication No. CN104794196, Jul. 22, 2015, 8 pages.
Machine Translation and Abstract of Chinese Publication No. CN105159915, Dec. 16, 2015, 17 pages.
Foreign Communication From A Counterpart Application, PCT Application No. PCT/CN2016/113981, English Translation of International Search Report dated Sep. 27, 2017, 3 pages.
Herlihy, M., "A Methodology for Implementing Highly Concurrent Data Structures," XP058399316, ACM SIGPLAN Notices, vol. 25, No. 3, Feb. 1990, pp. 197-206.
Foreign Communication From A Counterpart Application, European Application No. 16925553.6, Extended European Search Report dated Oct. 30, 2019, 8 pages.
Jiang Daoxia, Research on Key Technologies of Congestion Control in Mobile Ad Hoc Networks, Information Science and Technology Series of Full-text Database of Chinese Doctoral Dissertations, 2010, Issue 08, 3 pages.
Jochen, B., et al., "Tree (data structure)," Wikipedia, XP055799872, Retrieved from the Internet: URL:https://en.wikipedia.org/w/index.php?title=Tree_(data_structure)andoldid=754992732, Dec. 15, 2016, 8 pages.

* cited by examiner (1) (2) (3)

Second merged tree    Temporary tree M3

Merged temporary tree

PARALLEL COPYING DATABASE TRANSACTION PROCESSING

CROSS-REFERENCE TO RELATED APPLICATIONS

This application is a continuation of International Patent Application No. PCT/CN2016/113981 filed on Dec. 30, 2016, the disclosure of which is hereby incorporated by reference in its entirety.

TECHNICAL FIELD

This application relates to the field of database technologies, and in particular, to a transaction processing method and apparatus.

BACKGROUND

As a data modeling language for the Network Configuration Protocol (NETCONF), Yang is widely used to define a service data model in the software-defined networking field. A datastore at a model-driven service abstraction layer (MD-SAL) is a storage technology designed for Yang model data, and is also a core of MD-SAL model driving. A vast majority of service procedures rely on a transaction-based data operation capability and a hierarchical listening capability of the DataStore.

In a Yang model data transaction storage process, the DataStore is updating a tree data structure by committing a transaction. The transaction is a series of operations on the tree data structure. A series of operations included in each transaction need to be all performed or all not performed. In a transaction-based tree data structure storage technology, a logically independent in-memory tree is generated after each transaction is successfully executed, and an in-memory tree corresponding to a last transaction that is successfully executed is referred to as a state tree (that is, a base tree). To ensure isolation between transactions in a read/write process, an implementation in the existing art includes obtaining a snapshot of a current state tree when a transaction is created, performing a read/write operation based on the obtained snapshot, and committing the transaction. This avoids such phenomena as dirty read, non-repeatable read, and phantom read in a transaction read/write process. However, in this implementation, when the state tree is to be updated by committing a transaction, a new tree needs to be copied before an update operation is performed on the new tree, resulting in high overheads in time and memory resources.

Therefore, this application provides a transaction processing method, so as to resolve a problem of relatively high overheads in time and memory resources caused by that a new tree needs to be copied before an update operation is performed in a transaction processing process.

SUMMARY

This application provides a transaction processing method and apparatus, so as to resolve a problem of relatively high overheads in time and memory resources caused by that a new tree needs to be copied before an update operation is perform in a transaction processing process.

According to a first aspect, an embodiment of the present disclosure provides a transaction processing method, where the transaction is a series of operations on a tree data structure, the tree data structure includes a base tree, and the method includes obtaining, by a network device, M transactions from a transaction queue, where the M transactions are transactions that perform an update on a same base tree, a first transaction and a second transaction in the M transactions do not conflict, the first transaction and the second transaction are any two transactions in the M transactions, that the first transaction and the second transaction do not conflict means that a common subtree of the first transaction is neither a father nor a child of a common subtree of the second transaction, a common part that is of subtrees formed by operations performed on the base tree and that is formed by operations performed on the base tree in any transaction constitutes a common subtree of the transaction, and M is an integer greater than or equal to 2; performing, by the network device, reverse shallow copying in parallel for the M transactions, to generate M temporary trees corresponding to the M transactions, where a temporary tree corresponding to each transaction includes a tree that is formed after the transaction performs an update on the base tree; and merging, by the network device, the M temporary trees, and replacing the base tree with a merged temporary tree.

In this way, the network device first obtains, from the transaction queue, a plurality of transactions that do not conflict with each other, and performs reverse shallow copying in parallel for the transactions that do not conflict, to generate a plurality of temporary trees corresponding to the plurality of transactions. Because the plurality of transactions does not conflict, processing the transactions in parallel can ensure accurate and proper transaction processing. In addition, generating the temporary trees in a reverse shallow copying manner can effectively reduce consumption of time and memory. Further, processing of the plurality of transactions is implemented by means of merging the plurality of temporary trees. Compared with other approaches of generating a temporary tree and performing committing in series, this solution effectively improves the transaction execution efficiency.

Optionally, the merging, by the network device, the M temporary trees includes for the first temporary tree in the M temporary trees, using, by the network device, the first temporary tree as a first merged tree; for the $i^{th}$ temporary tree in the M temporary trees, merging, by the network device, the $i^{th}$ temporary tree into an $(i-1)^{th}$ merged tree, to obtain the $i^{th}$ merged tree, where the $(i1)^{th}$ merged tree is obtained by merging the first to the $(i-1)^{th}$ temporary trees, i is an integer, and $2 \leq i \leq M$; and using, by the network device, an $M^{th}$ merged tree as the merged temporary tree.

In this way, the network device merges the plurality of temporary trees in a serial manner, thereby ensuring that merging complexity is reduced to a maximum extent and that data is correctly updated.

Optionally, the merging, by the network device, the $i^{th}$ temporary tree into the $(i-1)^{th}$ merged tree, to obtain the $i^{th}$ merged tree includes for each temporary tree in the first to the $(i-1)^{th}$ temporary trees, comparing, by the network device, a path of a common subtree of a transaction corresponding to each temporary tree with a path of a common subtree of a transaction corresponding to the $i^{th}$ temporary tree, to obtain an initial to-be-merged path of the $i^{th}$ temporary tree relative to each temporary tree; determining, by the network device, a shortest initial to-be-merged path as a to-be-merged path of the $i^{th}$ temporary tree relative to the $(i-1)^{th}$ merged tree; and merging, by the network device, the to-be-merged path into the $(i-1)^{th}$ merged tree, to obtain the $i^{th}$ merged tree.

In this way, when the network device merges the $i^{th}$ temporary tree into the $(i-1)^{th}$ merged tree, the path of the common subtree of the transaction corresponding to the $i^{th}$ temporary tree is compared with paths of common subtrees of transactions corresponding to the first to the $(i-1)^{th}$ temporary trees, and the shortest initial to-be-merged path is determined as the to-be-merged path, thereby ensuring that the $i^{th}$ temporary tree is correctly merged into the $(i-1)^{th}$ merged tree.

Optionally, the obtaining, by a network device, M transactions from a transaction queue includes obtaining, by the network device using a head of the transaction queue as a start point, the first to the $M^{th}$ transactions successively from the transaction queue.

In this way, the network device obtains the first to the $M^{th}$ transactions using the head of the transaction queue as the start point, thereby ensuring orderliness of transaction processing.

Optionally, after the network device obtains the $(k-1)^{th}$ transaction from the transaction queue and before the network device obtains the $k^{th}$ transaction, the method further includes determining, by the network device, that a $k^{th}$ transaction does not conflict with any transaction in the first to a $(k-1)^{th}$ transactions, where k is an integer and $2 \leq k \leq M$.

In this way, the network device obtains the $k^{th}$ transaction when it is determined that the $k^{th}$ transaction does not conflict with each of the first to the $(k-1)^{th}$ transactions, thereby effectively ensuring that the finally obtained M transactions do not conflict with each other.

According to a second aspect, this application provides a transaction processing apparatus, which is configured to implement any method in the foregoing first aspect, and includes corresponding functional modules configured to implement steps of the foregoing methods.

According to a third aspect, this application provides a transaction processing apparatus, including a memory, a scheduler, and a processor, where the processor includes at least M processor cores; the memory is configured to store an instruction and a transaction queue; and the processor is configured to execute the instruction stored in the memory. When the processor executes the instruction stored in the memory, any method in the foregoing first aspect may be executed in combination with the scheduler.

In this application, a network device first obtains, from a transaction queue, a plurality of transactions that do not conflict with each other, and performs reverse shallow copying in parallel for the transactions that do not conflict, to generate a plurality of temporary trees corresponding to the plurality of transactions. Because the plurality of transactions does not conflict, processing the transactions in parallel can ensure accurate and proper transaction processing. In addition, generating the temporary trees in a reverse shallow copying manner can effectively reduce consumption of time and memory. Further, processing of the plurality of transactions is implemented by means of merging the plurality of temporary trees. Compared with other approaches of generating a temporary tree and performing committing in series, this solution effectively improves the transaction execution efficiency.

DESCRIPTION OF EMBODIMENTS

The following describes the embodiments of this application in detail with reference to the accompanying drawings in this specification.

A transaction is a series of operations on a tree data structure. Based on different manners of operations performed by transactions on the tree data structure, the transactions may be divided into read transactions and write transactions. The read transaction is a transaction that performs a read operation on a base tree in the tree data structure. A write transaction is a transaction that performs a write operation on the base tree in the tree data structure. Because the read transaction temporarily does not relate to updating of the base tree, transactions in this application mainly are write transactions.

Each transaction includes a group of update operations on different subtrees in the base tree. Therefore, each transaction may be considered as an update operation performed on a common part of the subtrees. A common part that is of subtrees formed by operations performed on the base tree and that is formed by operations performed on the base tree in each transaction constitutes a common subtree of the transaction.

Figure 1A:
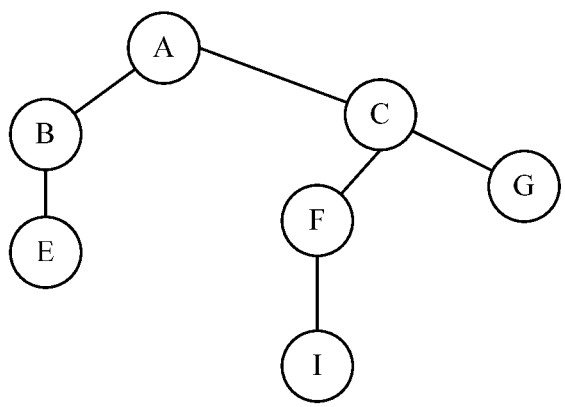
FIG. 1A is a schematic diagram of a base tree State0 in a tree data structure.
Figure 1B:
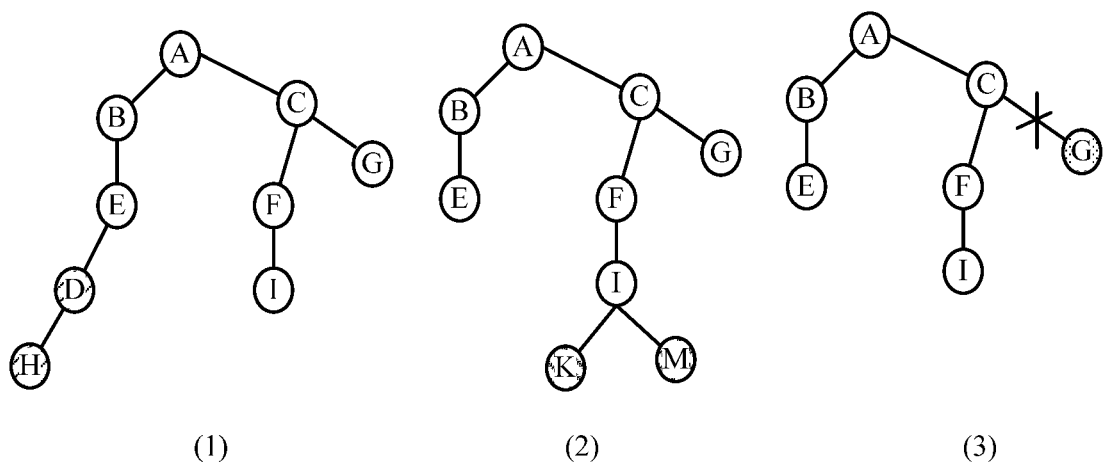
FIG. 1B is a schematic diagram of updating a base tree by three write transactions.

For example, as shown in FIG. 1A, FIG. 1A is a schematic diagram of a base tree State0 in a tree data structure. The base tree State0 includes a plurality of nodes (which are specifically A, B, C, E, F, G and I), and each node is a subtree. As shown in (1) of FIG. 1B, (1) of FIG. 1B is a schematic diagram of updating the base tree State0 by a transaction T1. Specifically, the transaction T1 adds a subtree D under a subtree B, and adds a subtree H under the added subtree D. In this way, the transaction T1 may be considered as an update operation on a common subtree D. As shown in (2) of FIG. 1B, (2) of FIG. 1B is a schematic diagram of updating the base tree by a transaction T2. Specifically, the transaction T2 adds a subtree K and a subtree M under a subtree I. In this way, the transaction T2 may be considered as an update operation on a common subtree I. As shown in (3) of FIG. 1B, (3) of FIG. 1B is a schematic diagram of updating the base tree by a transaction T3. Specifically, the transaction T3 deletes a subtree G under a subtree C. In this way, the transaction T3 may be considered as an update operation on a common subtree C.

To ensure isolation between transactions in a read/write process, in an implementation in the existing art, a transaction performs an operation based on a snapshot of a base tree. The following describes the implementation.

Figure 2A:
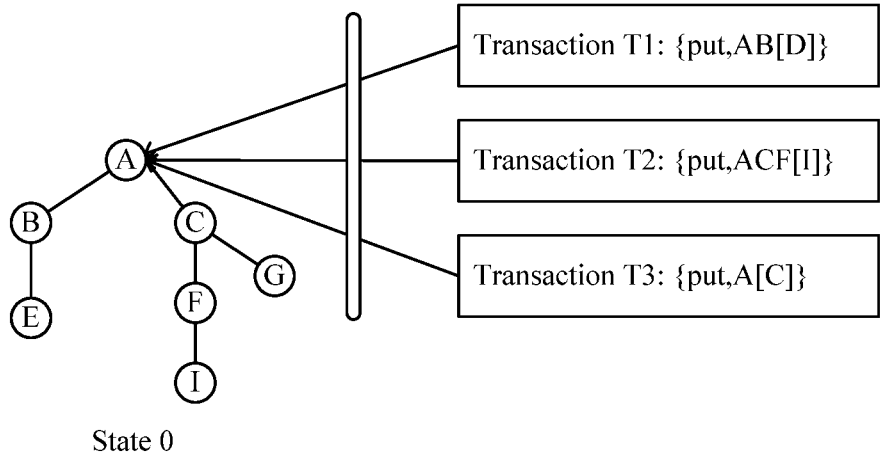
FIG. 2A is a schematic diagram of creating three write transactions in parallel and separately forming respective common subtrees based on a base tree.

Specifically, as shown in FIG. 2A, FIG. 2A is a schematic diagram of creating three transactions in parallel and separately forming respective common subtrees based on a base tree. A common subtree of the transaction T1 is D, and AB[D] indicates a path of the common subtree. A common subtree of the transaction T2 is I, and ACF[I] indicates a path of the common subtree. A common subtree of the transaction T3 is C, and A[C] indicates a path of the common subtree. A path of a common subtree is a reverse path from the common subtree to an initial node (for example, a node A shown in FIG. 2A) of a base tree.

Figure 2B:
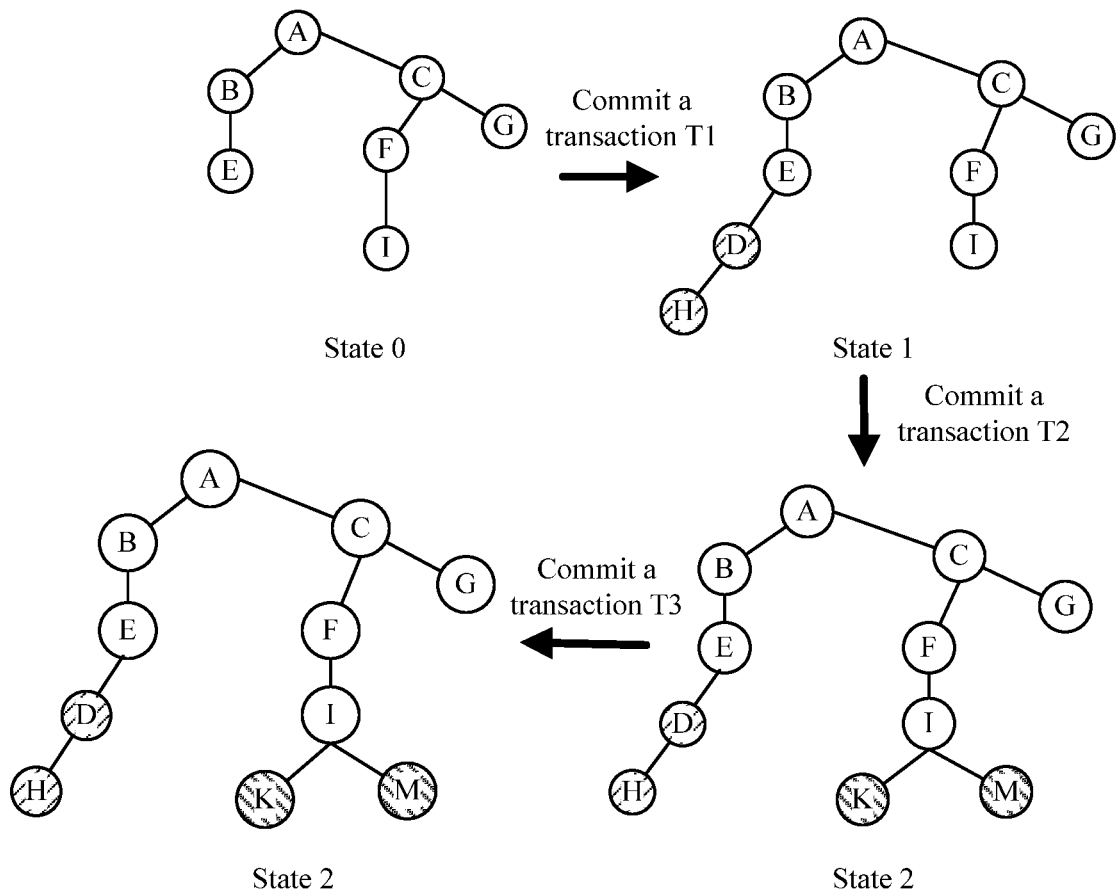
FIG. 2B is a schematic diagram of a process of committing three write transactions.

FIG. 2B is a schematic diagram of a process of committing three transactions. As shown in FIG. 2B, when the transaction T1 is committed, a validity check is performed to determine that all nodes on the path of the common subtree of the transaction T1 are not modified and that an update of the common subtree may be applied to the base tree State0, and then the base tree State0 is copied and a modification of the transaction T1 is added, to obtain a base tree State1. When the transaction T2 is committed, a validity check is performed to determine that all nodes on the path of the common subtree of the transaction T2 are not modified and that an update of the common subtree may be applied to the base tree State1, and then the base tree State1 is copied and a modification of the transaction T2 is added, to obtain a base tree State2. When the transaction T3 is committed, a validity check is performed to determine that a node on the path of the common subtree of the transaction T3 is modified; as a result, the validity check of the transaction T3 fails, and the base tree State2 remains unchanged.

It can be learned that in the foregoing manner, when a transaction is committed, a new tree needs to be first copied and an update operation is then executed on the new tree, resulting in relatively large consumption of time and memory.

To resolve a problem of relatively large consumption of time and memory, another transaction processing method is provided in the existing art, that is, a method used by a DataStore of an open source controller (English: OpenDaylight, ODL), to achieve an effect of isolation by copying only a node on a path of a common subtree (reverse shallow copying).

The following first specifically describes reverse shallow copying.

Figure 2C:
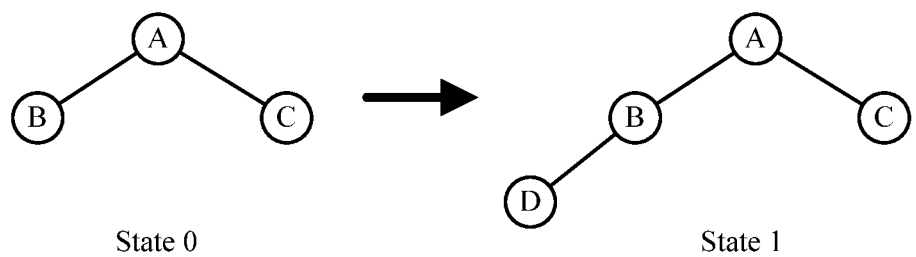
FIG. 2C is a schematic diagram of updating a base tree by one write transaction.

A tree data structure may be described using a nested map. As shown in FIG. 2C, obtaining a base tree State1 by adding a subtree D to a subtree B of a base tree State0 that includes A, B, and C may be described in the following manner:

```
Map_A{
 <Id-B, Map_B{
  <Id-D, Value-D>
  {>,
  <Id-C, Value-C>
}
```

A new map obtained by means of reverse shallow copying retains all elements in a copied map.

The following describes a process of generating a temporary tree by means of reverse shallow copying: performing reverse shallow copying for a transaction according to a path of a common subtree, to construct a logically independent temporary tree, and assuming that the path of the common subtree of the transaction is x1, . . . , xi−1, xi[A]; performing shallow copying on a map corresponding to xi in a state tree to obtain Xi, and adding A; performing shallow copying on a map corresponding to xi−1 in the state tree to obtain Xi−1, and adding Xi; . . . performing shallow copying on a map corresponding to x1 in the state tree to obtain X1, and adding X2, so as to obtain a logically independent temporary tree with a root X1.

Figure 2D:
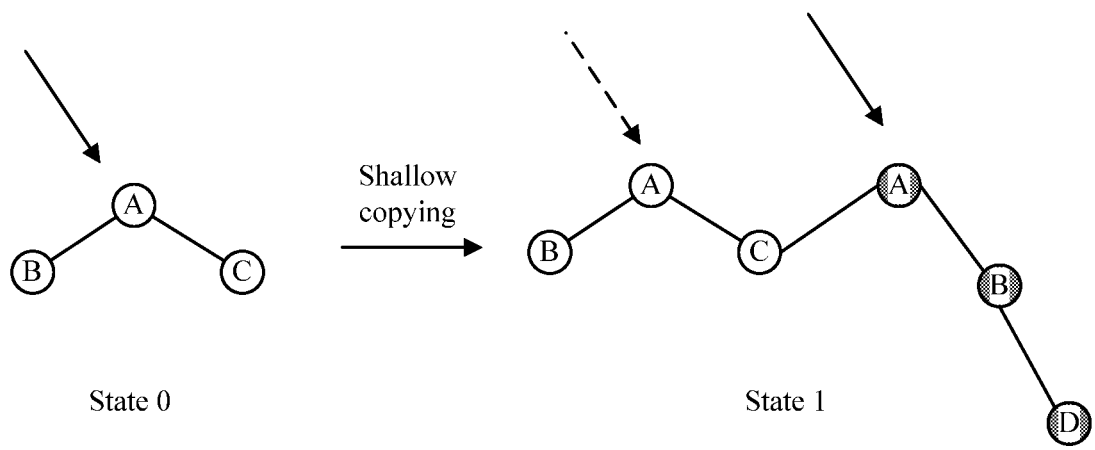
FIG. 2D is a schematic diagram of a process of generating a temporary tree based on reverse shallow copying and performing committing.

With reference to FIG. 2D, the following describes an example of a process of generating a temporary tree based on reverse shallow copying and performing committing. Specifically, the following steps are included.

Step a: Perform shallow copying on B in a State0 to generate B′, and add a D element.

Step b: Perform shallow copying on A in the State0 to generate A′, and add a B′ element.

Step c: Switch a base tree from A to A′, so as to complete transaction committing.

Step a and step b are a process of generating a temporary tree based on reverse shallow copying, and step c is a transaction committing process.

It can be learned from the foregoing content that a reverse shallow copying manner reduces consumption of time and memory to some extent. However, serial processing is used for transaction processing. That is, first, a temporary tree of the transaction T1 is generated by means of reverse shallow copying and committing is performed, then a temporary tree of the transaction T2 is generated by means of reverse shallow copying and committing is performed. The rest can be deduced by analogy. A multi-thread processing capability of a computer cannot be used in such a serial processing process, resulting in relatively low transaction execution efficiency.

Based on this, this application provides a transaction processing method, so as to resolve a problem of relatively high overheads in time and memory resources caused by that a new tree needs to be copied before an update operation is performed in a transaction processing process, and also to improve the transaction execution efficiency.

The transaction processing method in this application may be applied to a storage scenario, of a plurality of data modeling languages, in which a tree data structure is updated by committing a transaction, and is especially applicable to a Yang model data storage scenario. The transaction processing method in this application is applied to Yang model data processing, and this can effectively improve a Yang model data storage capability of a DataStore.

Figure 3:
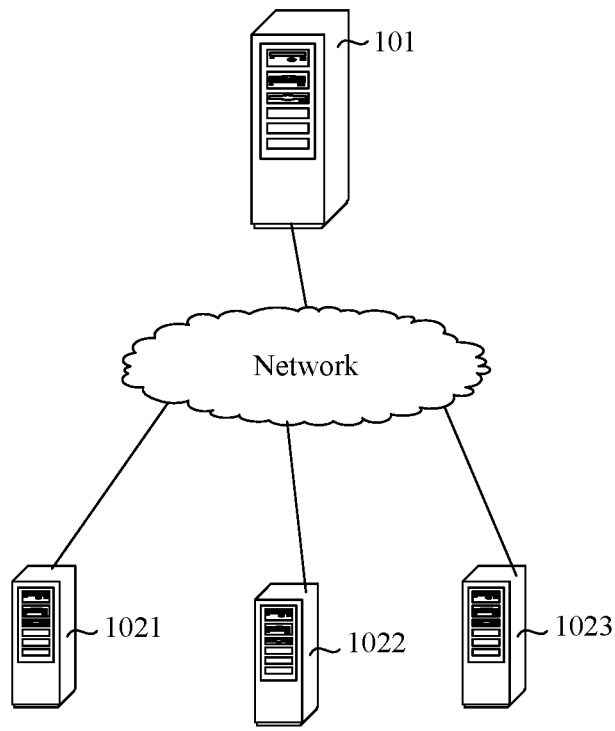
FIG. 3 is a schematic diagram of a system architecture to which this application is applicable.

The transaction processing method in this application may be applied to a plurality of system architectures. FIG. 3 is a schematic diagram of a system architecture to which this application is applicable. As shown in FIG. 3, the system architecture includes a network device 101 and one or more client devices, for example, a first client device 1021, a second client device 1022, and a third client device 1023 that are shown in FIG. 3. The first client device 1021, the second client device 1022, and the third client device 1023 may communicate with the network device 101 using a network. For example, the first client device 1021, the second client device 1022, and the third client device 1023 may send a transaction request message to the network device 101 using the network. After receiving a transaction request message sent by a client device, the network device 101 may store a transaction in the transaction request message into a transaction queue, to facilitate subsequent processing of the transaction.

Specifically, the network device may be a variety of devices with computing and storage capabilities, for example, a computer device such as a server, a host, or a personal computer (PC). For another example, a network device may alternatively be a software-defined networking (SDN) controller.

It should be noted that only one network device is used as an example for description in the foregoing system architecture, and this application may also be applicable to a plurality of network devices and a plurality of client devices that are disposed in a cluster mode.

Figure 4:
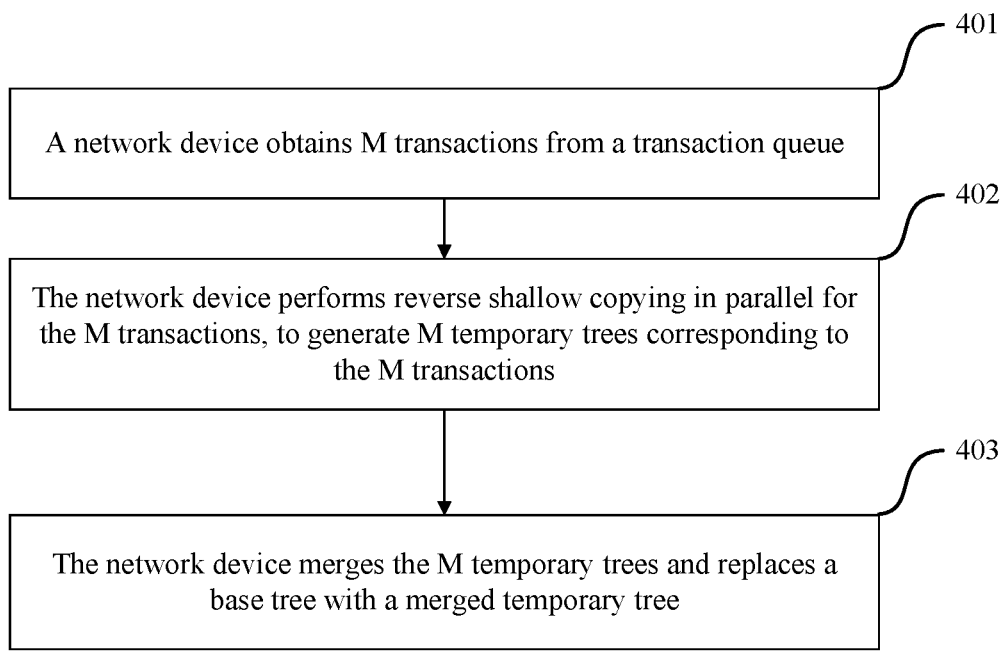
FIG. 4 is a schematic flowchart corresponding to a transaction processing method according to Embodiment 1 of this application.

Based on the foregoing system architecture, FIG. 4 is a schematic flowchart corresponding to a transaction processing method according to an embodiment of this application. The method may be executed by the network device in the foregoing system architecture. As shown in FIG. 4, the method includes the following.

Step 401: The network device obtains M transactions from a transaction queue, where the M transactions are transactions that perform an update on a base tree, a first transaction and a second transaction in the M transactions do not conflict, the first transaction and the second transaction are any two transactions in the M transactions, that the first transaction and the second transaction do not conflict means that a common subtree of the first transaction is neither a father nor a child of a common subtree of the second transaction, a common part that is of subtrees formed by operations performed on the base tree and that is formed by operations performed on the base tree in any transaction constitutes a common subtree of the transaction, and M is an integer greater than or equal to 2.

Step 402: The network device performs reverse shallow copying in parallel for the M transactions, to generate M temporary trees corresponding to the M transactions, where a temporary tree corresponding to each transaction includes a tree that is formed after the transaction performs an update on the base tree.

Step 403: The network device merges the M temporary trees and replaces the base tree with a merged temporary tree.

It can be learned that the network device first obtains, from the transaction queue, a plurality of transactions that do not conflict with each other, and performs reverse shallow copying in parallel for the transactions that do not conflict, to generate a plurality of temporary trees corresponding to the plurality of transactions. Because the plurality of transactions does not conflict, processing the transactions in parallel can ensure accurate and proper transaction processing. In addition, generating the temporary trees in a reverse shallow copying manner can effectively reduce consumption of time and memory. Further, processing of the plurality of transactions is implemented by merging the plurality of temporary trees. Compared with other approaches of generating a temporary tree and performing committing in series, this solution effectively improves the transaction execution efficiency.

In this application, after receiving a transaction request message sent by one or more clients that are connected to the network device, the network device may add a transaction in the transaction request message to the transaction queue according to a chronological order of receive time. That is, receive time of a transaction at a head of the transaction queue is earlier than receive time of a transaction at a tail of the transaction queue. When processing a transaction subsequently, the network device needs to start execution from the head of the transaction queue, that is, process a transaction with an earlier receive time in priority, so as to ensure orderliness of transaction execution. Based on this, in step 401, the network device obtains the first to the $M^{th}$ transactions successively from the head of the transaction queue. To ensure that the first to the $M^{th}$ transactions can be processed in parallel subsequently, after obtaining the $(k-1)^{th}$ transaction from the transaction queue and before obtaining the $k^{th}$ transaction, the network device needs to detect whether there is a conflict between the $k^{th}$ transaction and the first to the $(k-1)^{th}$ transactions already obtained by the network device. After determining that the $k^{th}$ transaction does not conflict with all of the first to the $(k-1)^{th}$ transactions, the network device may obtain the $k^{th}$ transaction, where k is an integer and $2 \leq k \leq M$.

In a specific implementation, a quantity of transactions obtained by the network device from the transaction queue needs to be less than or equal to a first threshold. That is, M is less than or equal to the first threshold. The first threshold may be set by a person skilled in the art according to a processing capability of the network device (for example, a quantity of processor cores included in the network device) and another status. No limitation is specifically imposed.

It should be noted that the foregoing M transactions that are processed in parallel need to be transactions that perform an update on a same base tree. In this application, all transactions stored in a transaction queue are transactions that perform an update on a same base tree. Therefore, the M transactions obtained by the network device from the transaction queue are transactions that perform an update on the same base tree, and in a process of obtaining the first to the $M^{th}$ transactions, there is no need to further detect whether these transactions are transactions that perform an update on the same base tree.

Figure 5:
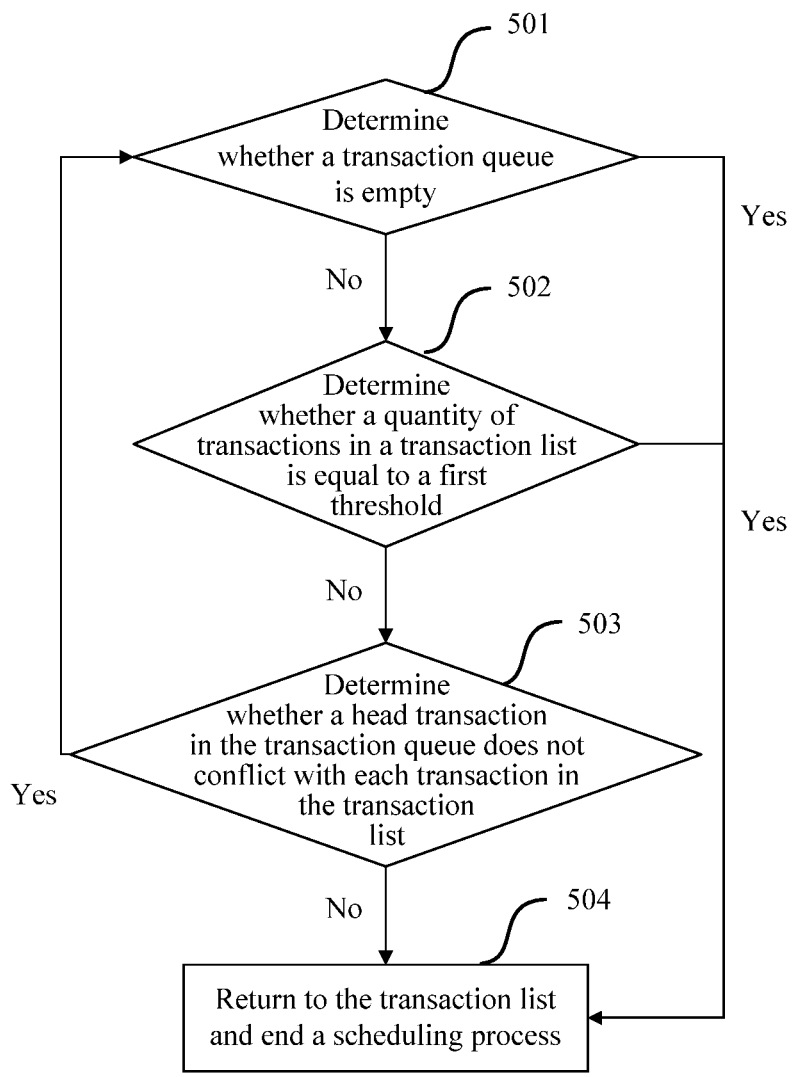
FIG. 5 is a schematic diagram of a specific process of obtaining M transactions from a transaction queue.

With reference to FIG. 5, the following describes a specific process of obtaining M transactions from a transaction queue. As shown in FIG. 5, the following steps are included.

Step 501: Determine whether a transaction queue is empty. If the transaction queue is empty, perform step 504; or if the transaction queue is not empty, perform step 502.

It should be noted that in this application, if it is determined that the transaction queue is empty when step 501 is performed for the first time, the process ends, and when it is subsequently determined that the transaction queue is not empty, the process starts. If it is determined that the transaction queue is empty after step 501 is cyclically performed (for the $p^{th}$ time, where p is an integer greater than or equal to 2), step 504 may be performed.

Step 502: Determine whether a quantity of transactions in a transaction list is equal to a first threshold. If the quantity of transactions in the transaction list is equal to the first threshold, perform step 504. If the quantity of transactions in the transaction list is not equal to the first threshold, perform step 503.

Step 503: Detect whether there is a conflict between a head transaction in the transaction queue and each transaction in the transaction list. If the head transaction does not conflict with each transaction in the transaction list, pop up the head transaction from the transaction queue, add the head transaction to the transaction list, and perform step 501. If the head transaction conflicts with at least one transaction in the transaction list, perform step 504.

Step 504: Return to the transaction list and end a scheduling process.

For example, as shown in Table 1a, a transaction queue includes a plurality of transactions, which are successively a transaction 1, a transaction 2, a transaction 3, a transaction 4, a transaction 5, . . . from head to tail. At this time, as shown in Table 1b, a transaction list is empty.

TABLE 1a

| Schematic diagram of a transaction queue | | | | | |
|---|---|---|---|---|---|
| Transaction queue | Transaction 1 | Transaction 2 | Transaction 3 | Transaction 4 | Transaction 5 . . . |

TABLE 1b

| Schematic diagram of a transaction list |
|---|
| Transaction list |

Because the transaction list is empty, a network device may obtain the transaction 1 directly from the transaction queue and add the transaction 1 to the transaction list. At this time, the transaction queue and the transaction list are shown in Table 2a and Table 2b, respectively.

TABLE 2a

| Schematic diagram of a transaction queue | | | | |
|---|---|---|---|---|
| Transaction queue | Transaction 2 | Transaction 3 | Transaction 4 | Transaction 5 . . . |

TABLE 2b

| Schematic diagram of a transaction list | |
|---|---|
| Transaction list | Transaction 1 |

After determining that a quantity of transactions in the transaction list is less than a first threshold (it is assumed the first threshold is 6), the network device detects whether there is a conflict between a head transaction (the transaction 2) in the transaction queue shown in Table 2a and the transaction 1 in the transaction list. After determining that the transaction 1 does not conflict with the transaction 2, the network device adds the transaction 2 to the transaction list. At this time, the transaction queue and the transaction list are shown in Table 3a and Table 3b, respectively.

TABLE 3a

| Schematic diagram of a transaction queue | | | | |
|---|---|---|---|---|
| Transaction queue | Transaction 3 | Transaction 4 | Transaction 5 | . . . |

TABLE 3b

| Schematic diagram of a transaction list | | |
|---|---|---|
| Transaction list | Transaction 1 | Transaction 2 |

After determining that the quantity of transactions in the transaction list is less than the first threshold (it is assumed that the first threshold is 6), the network device detects whether there is a conflict between a head transaction (the transaction 3) in the transaction queue shown in Table 3a and the transaction 1 and the transaction 2 in the transaction list. After determining that the transaction 3 does not conflict with the transaction 1 and that the transaction 3 conflicts with the transaction 2, the network device may end a scheduling process and return to the transaction list shown in Table 3b. That is, the network device obtains two transactions (the transaction 1 and the transaction 2) from the transaction queue, and subsequently may process the transaction 1 and the transaction 2 in parallel in step 402.

It can be learned that, after determining that there is a conflict between the transaction 3 and a transaction in the transaction list, the network device ends scheduling and does not obtain a transaction following the transaction 3 in the transaction queue, thereby ensuring orderliness of transaction execution.

The following specifically describes conflict detection in this embodiment of the present disclosure.

A transaction in the transaction queue, for example, the transaction T1, the transaction T2, or the transaction T3 as shown in FIG. 1B, generally performs an operation on a different subtree of a base tree. Considering a case in which if a plurality of transactions are directly obtained for parallel processing, in a subsequent merging process, an update performed on the base tree by a transaction may be overwritten by an update performed on the base tree by another transaction, in this application, conflict detection needs to be performed for a transaction when the M transactions are obtained in step 401, so as to ensure that any two transactions in the obtained M transactions do not conflict. Specifically, if a first transaction and a second transaction are any two transactions in the M transactions, that the first transaction and the second transaction do not conflict means that a common subtree of the first transaction is neither a father nor a child of a common subtree of the second transaction. That is, the common subtree of the first transaction is not on a path of the common subtree of the second transaction, and the common subtree corresponding to the second transaction is not on a path of the common subtree of the first transaction.

For example, among the transaction T1, the transaction T2, and the transaction T3 in FIG. 1B and FIG. 2A, for the transaction T1 and the transaction T2, a common subtree of the transaction T1 is D, a common subtree of the transaction T2 is I, and the common subtree of the transaction T1 is neither a father nor a child of the common subtree of the transaction T2. Therefore, the transaction T1 and the transaction T2 do not conflict. For the transaction T2 and the transaction T3, a common subtree of the transaction T3 is C. Because the common subtree of the transaction T3 is on a path of the common subtree of the transaction T2, the transaction T2 and the transaction T3 conflict.

In this application, for a process of performing reverse shallow copying to generate a temporary tree in step 402, reference may be made to the foregoing description. It should be noted that in the existing art, reverse shallow copying for generating a temporary tree is executed in series, whereas in this application, reverse shallow copying is performed in parallel for a plurality of transactions to generate a plurality of temporary trees corresponding to the plurality of transactions. Specifically, the network device in this application may include a plurality of processor cores, each processor core may execute one process, and the plurality of processor cores execute a plurality of processes, to implement parallel processing.

Figure 6:
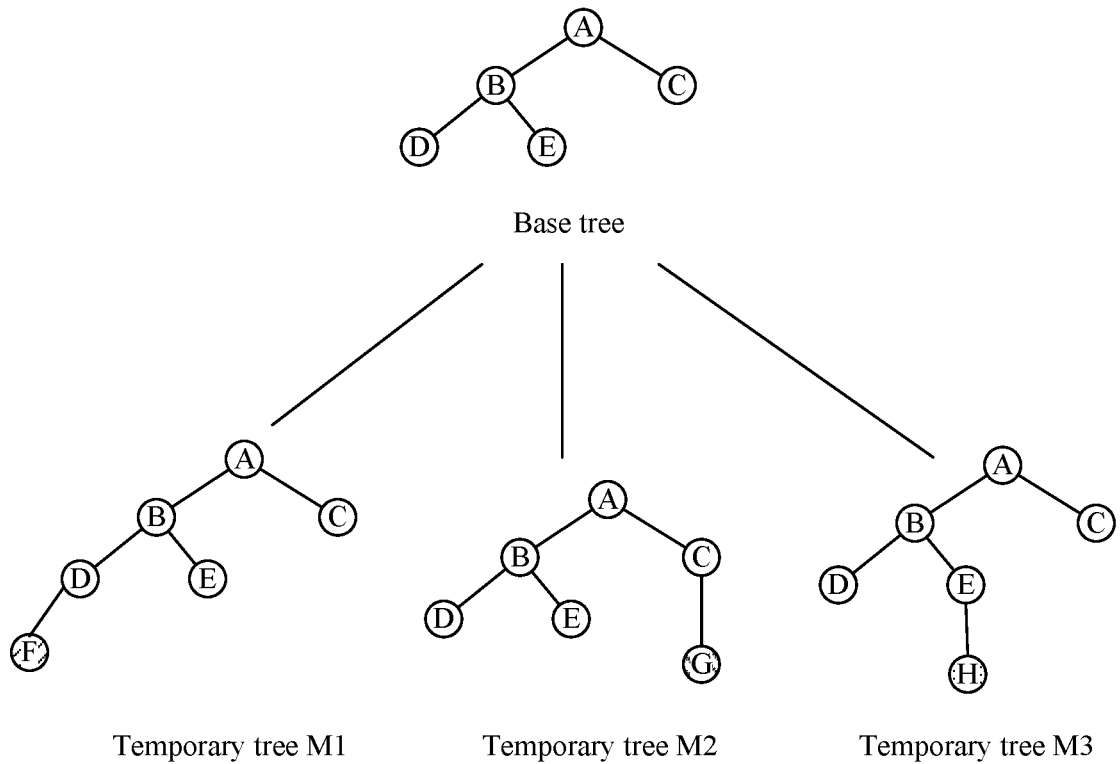
FIG. 6 is a schematic diagram of generating temporary trees in parallel.

FIG. 6 is a schematic diagram of generating temporary trees in parallel. As shown in FIG. 6, a base tree is ABCDE. It is assumed that M transactions are a transaction M1 (adding a subtree F on a subtree D), a transaction M2 (adding a subtree G on a subtree C), and a transaction M3 (adding a subtree H on a subtree E). After reverse shallow copying is performed in parallel for the transaction M1, the transaction M2, and the transaction M3, a temporary tree M1 corresponding to the transaction M1, a temporary tree M2 corresponding to the transaction M2, and a temporary tree M3 corresponding to the transaction M3 are generated.

In step 403, the network device may merge the generated M temporary trees in a serial manner. Specifically, for the first temporary tree in the M temporary trees, the network device uses the first temporary tree as the first merged tree. For the $i^{th}$ temporary tree in the M temporary trees, the network device merges the $i^{th}$ temporary tree into the $(i-1)^{th}$ merged tree, to obtain the $i^{th}$ merged tree, where the $(i-1)^{th}$ merged tree is obtained by merging the first to the $(i-1)^{th}$ temporary trees, i is an integer, and 2≤i≤M. Then, the network device uses the $M^{th}$ merged tree as the merged temporary tree. The first temporary tree may be any temporary tree in the M temporary trees, and a merging order may be random. In this embodiment of the present disclosure, an order in which the M temporary trees are merged is not limited, provided that serial merging is performed. For example, for the temporary tree Ml, the temporary tree M2, and the temporary tree M3 that are generated in FIG. 6, a merging process may be the temporary tree M1→the temporary tree M2→the temporary tree M3. That is, the temporary tree M1 is used as the first merged tree, the temporary tree M2 is merged into the first merged tree, to obtain the second merged tree, and the temporary tree M3 is merged into the second merged tree, to obtain the merged temporary tree. In this way, the network device merges a plurality of temporary trees in a serial manner, thereby ensuring that merging complexity is reduced to a maximum extent and that data is correctly updated.

The following describes a process in which the network device merges the temporary tree into the $(i-1)^{th}$ merged tree to obtain the $i^{th}$ merged tree.

For each temporary tree in the first to the $(i-1)^{th}$ temporary trees, the network device compares a path of a common subtree of a transaction corresponding to each temporary tree with a path of a common subtree of a transaction corresponding to the $i^{th}$ temporary tree, to obtain an initial to-be-merged path of the $i^{th}$ temporary tree relative to each temporary tree.

Specifically, it is assumed that a path of a common subtree of a transaction corresponding to the $(i-1)^{th}$ temporary tree is $X_1X_2, \ldots, X_n[A]$, and that the path of the common subtree of the transaction corresponding to the $i^{th}$ temporary tree is $Y_1Y_2, \ldots, Y_n[B]$. Starting from an index of 2, it is determined successively whether $X_{index}$ and $Y_{index}$ are equal. It is assumed that $X_k \neq Y_k$ when index=K. Then, an initial to-be-merged path of the $i^{th}$ temporary tree relative to the $(i-1)^{th}$ temporary tree is $Y_k, \ldots, Y_n[B]$. In this manner, an initial to-be-merged path of the $i^{th}$ temporary tree relative to each temporary tree in the first to the $(i-1)^{th}$ temporary trees can be obtained. Then, a shortest initial to-be-merged path is determined as a to-be-merged path of the $i^{th}$ temporary tree relative to the $(i-1)^{th}$ merged tree, and the to-be-merged path is merged into the $(i-1)^{th}$ merged tree, to obtain the $i^{th}$ merged tree. The shortest initial to-be-merged path is an initial to-be-merged path that includes a minimum quantity of nodes. In this way, the network device determines the shortest initial to-be-merged path as the to-be-merged path, thereby ensuring that the $i^{th}$ temporary tree is correctly merged into the $(i-1)^{th}$ merged tree.

For example, the temporary tree M3 is merged into the second merged tree in the foregoing. A path (ABD[F]) of a common subtree of the transaction corresponding to the temporary tree M1 is compared with a path (ABE[H]) of a common subtree of the transaction corresponding to the temporary tree M3, to obtain an initial to-be-merged path E[H] of the temporary tree M3 relative to the temporary tree M1. A path (AC[G]) of a common subtree of the transaction corresponding to the temporary tree M2 is compared with the path (ABE[H]) of the common subtree of the transaction corresponding to the temporary tree M3, to obtain an initial to-be-merged path (BE[H]) of the temporary tree M3 relative to the temporary tree M2. By comparison, it can be learned that the initial to-be-merged path (E[H]) is the shortest; then, the initial to-be-merged path (E[H]) may be determined as a to-be-merged path of the temporary tree M3 relative to the second merged tree, and is merged into the second merged tree.

In a specific implementation, after the $i^{th}$ merged tree is obtained, the path list corresponding to the $i^{th}$ merged tree may be stored. The $i^{th}$ path list includes paths of common subtrees of transactions corresponding to the first to the $i^{th}$ temporary trees.

The following uses the foregoing merging process of the temporary tree M1→the temporary tree M2→the temporary tree M3 as an example for description.

Figure 7A:
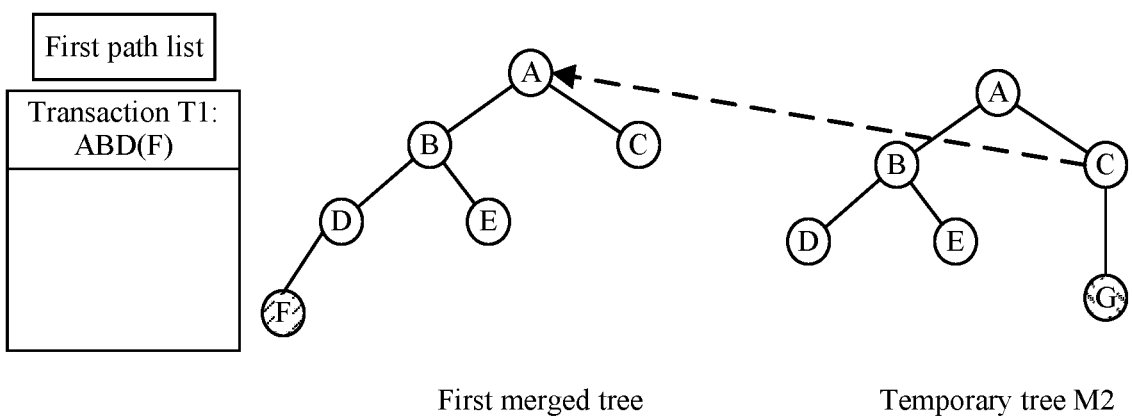
FIG. 7A is a schematic diagram of merging a temporary tree M2 into the first merged tree.
Figure 7B:
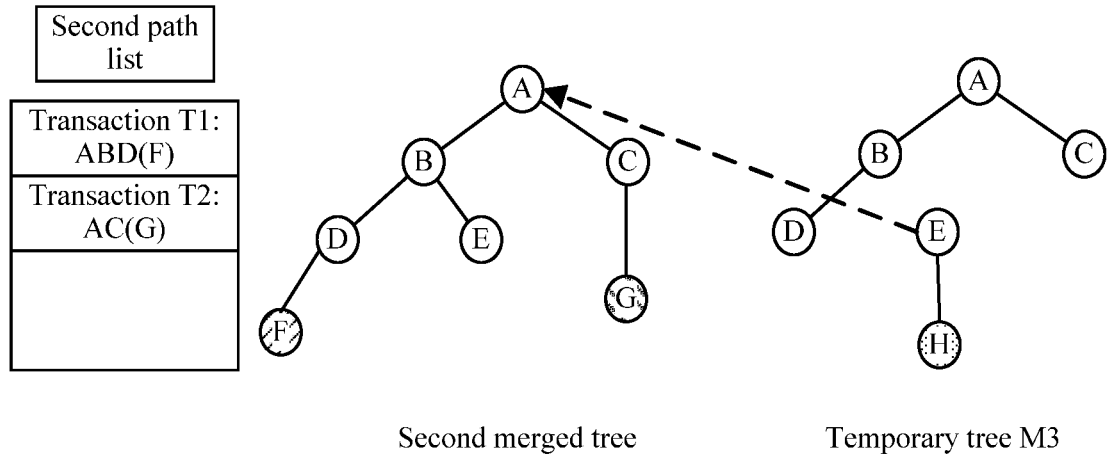
FIG. 7B is a schematic diagram of merging a temporary tree M3 into the second merged tree.
Figure 7C:
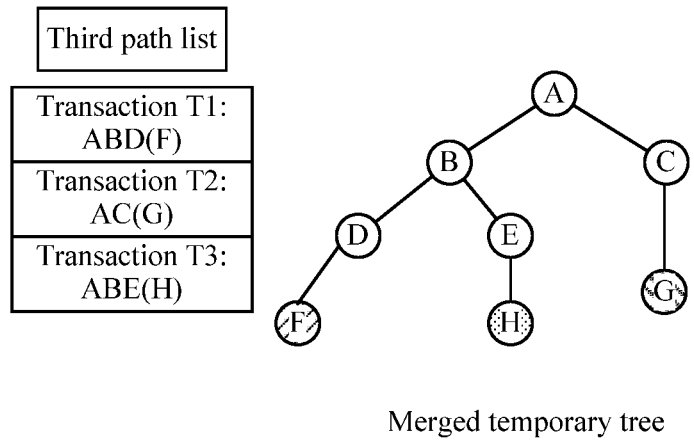
FIG. 7C is a schematic diagram of a merged temporary tree.

As shown in FIG. 7A, FIG. 7B, and FIG. 7C, the temporary tree M1 is used as the first merged tree, and the path of the common subtree of the transaction M1 corresponding to the temporary tree M1 is added into a path list, to obtain a first path list corresponding to the first merged tree. The path of the common subtree of the transaction corresponding to the temporary tree M2 is compared with the path of the common subtree of the transaction M1 in the first path list, to obtain a to-be-merged path C[G] of the temporary tree M2 relative to the first merged tree. The to-be-merged path C[G] is merged into the first merged tree, to obtain the second merged tree, and the path of the common subtree of the transaction M2 corresponding to the temporary tree M2 is added into the first path list, to obtain a second path list corresponding to the second merged tree. The path of the common subtree of the transaction corresponding to the temporary tree M3 is compared separately with two paths in the second path list, to obtain a to-be-merged path E[H] of the temporary tree M3 relative to the second merged tree. E[H] is merged into the second merged tree to obtain the third merged three and the path of the common subtree of the transaction M3 corresponding to the temporary tree M3 is added into the first path list, to obtain the merged temporary tree, and subsequently, the merged temporary tree may be used to replace the base tree.

Figure 8:
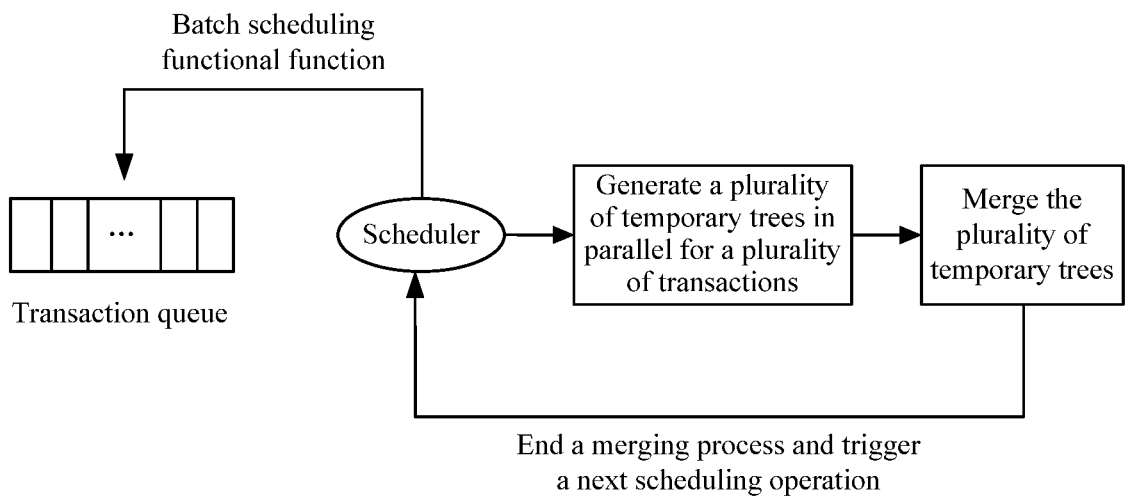
FIG. 8 is a schematic diagram of an entire process of transaction processing in this application.

FIG. 8 is a schematic diagram of an entire process of transaction processing in this application. As shown in FIG. 8, a network device may obtain a plurality of transactions from a transaction queue using a batch scheduling functional function (Batch-Loading(N)) of a scheduler (Scheduler), and after completing parallel processing on the plurality of transactions, that is, completing a process of merging temporary trees that are generated for the plurality of transactions, may trigger a scheduler module to perform a next scheduling operation. That is, the network device in this embodiment of the present disclosure may cyclically perform the foregoing step 401 to step 403, to perform parallel processing on transactions in the transaction queue.

For the foregoing method procedure, this application further provides a network device. For specific content of the network device, reference may be made to the foregoing method implementation.

Figure 9:
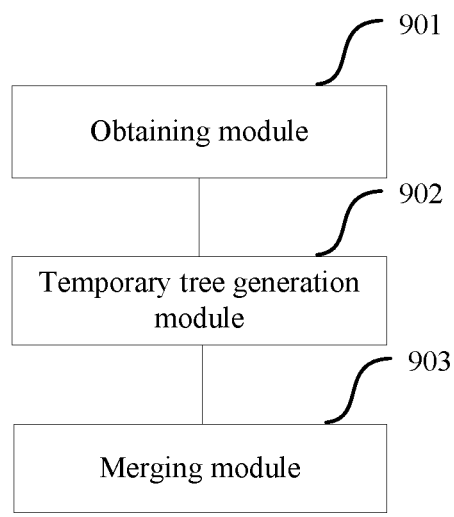
FIG. 9 is a schematic structural diagram of a network device according to this application.

FIG. 9 is a schematic structural diagram of a network device according to this application. As shown in FIG. 9, the network device includes an obtaining module 901 configured to obtain M transactions from a transaction queue, where the M transactions are transactions that perform an update on a base tree, a first transaction and a second transaction in the M transactions do not conflict, the first transaction and the second transaction are any two transactions in the M transactions, that the first transaction and the second transaction do not conflict means that a common subtree of the first transaction is neither a father nor a child of a common subtree of the second transaction, a common part that is of subtrees formed by operations performed on the base tree and that is formed by operations performed on the base tree in any transaction constitutes a common subtree of the transaction, and M is an integer greater than or equal to 2; a temporary tree generation module 902 configured to perform reverse shallow copying in parallel for the M transactions, to generate M temporary trees corresponding to the M transactions, where a temporary tree corresponding to each transaction includes a tree that is formed after the transaction performs an update on the base tree; and a merging module 903 configured to merge the M temporary trees and replace the base tree with a merged temporary tree.

Optionally, the merging module 903 is specifically configured to for the first temporary tree in the M temporary trees, use the first temporary tree as a first merged tree; for the $i^{th}$ temporary tree in the M temporary trees, merge the $i^{th}$ temporary tree into an $(i-1)^{th}$ merged tree, to obtain the $i^{th}$ merged tree, where the $(i-1)^{th}$ merged tree is obtained by merging the first to the $(i-1)^{th}$ temporary trees, i is an integer, and $2 \leq i \leq M$; and use an $M^{th}$ merged tree as the merged temporary tree.

Optionally, the merging module 903 is specifically configured to for each temporary tree in the first to the $(i-1)^{th}$ temporary trees, compare a path of a common subtree of a transaction corresponding to each temporary tree with a path of a common subtree of a transaction corresponding to the $i^{th}$ temporary tree, to obtain an initial to-be-merged path of the $i^{th}$ temporary tree relative to each temporary tree; determine a shortest initial to-be-merged path as a to-be-merged path of the $i^{th}$ temporary tree relative to the $(i-1)^{th}$ merged tree; and merge the to-be-merged path into the $(i-1)^{th}$ merged tree, to obtain the $i^{th}$ merged tree.

Optionally, the obtaining module 901 is specifically configured to obtain, using a head of the transaction queue as a start point, the first to the $M^{th}$ transactions successively from the transaction queue.

Optionally, after obtaining a $(k-1)^{th}$ transaction from the transaction queue and before obtaining a $k^{th}$ transaction, the obtaining module 901 is further configured to determine that the $k^{th}$ transaction does not conflict with any transaction in the first to the $(k-1)^{th}$ transactions, where k is an integer and $2 \leq l \leq M$.

Figure 10:
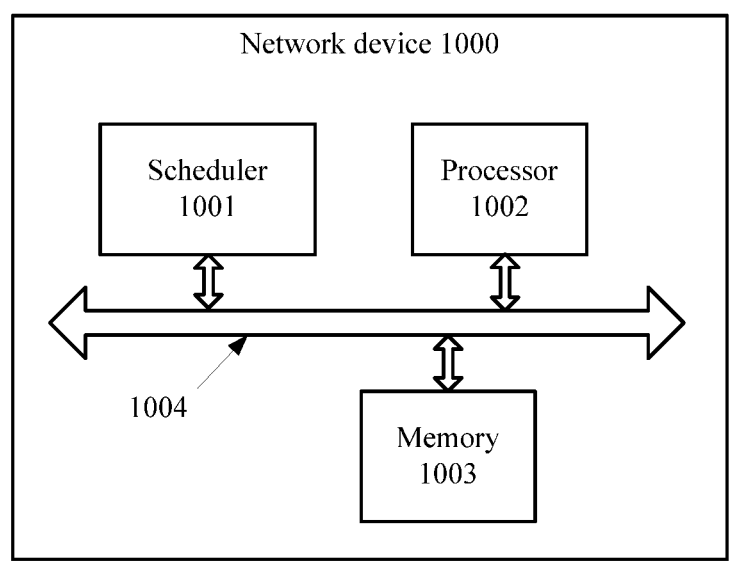
FIG. 10 is a schematic structural diagram of another network device according to this application.

FIG. 10 is a schematic structural diagram of another network device according to an embodiment of the present disclosure. As shown in FIG. 10, the network device includes a scheduler 1001, a processor 1002, a memory 1003, and a bus system 1004.

The memory 1003 is configured to store a program and a transaction queue. Specifically, the program may include program code, where the program code includes a computer operation instruction. The memory 1003 may be a random access memory (RAM), or may be a non-volatile memory, for example, at least one magnetic disk memory. In the figure, only one memory is shown. Certainly, a plurality of memories may alternatively be disposed according to a requirement. The memory 1003 may alternatively be a memory in the processor 1002.

The memory 1003 stores the following elements: an executable module or a data structure, or a subset thereof, or an extended set thereof.

The processor 1002 controls an operation of the network device 1000, and the processor 1002 may also be referred to as a central processing unit (CPU). During specific application, components of the network device 1000 are coupled together using the bus system 1004. In addition to a data bus, the bus system 1004 may further include a power bus, a control bus, a status signal bus, and the like. However, for clearer description, various buses in the figure are marked as the bus system 1004, and for ease of illustration, are only schematically drawn in FIG. 10.

The foregoing methods disclosed by the embodiments of this application may be applied to the processor 1002, or be implemented by the processor 1002. The processor 1002 may be an integrated circuit chip that has a signal processing capability. In an implementation process, the steps of the foregoing methods may be completed using a hardware-form integrated logic circuit or software-form instructions in the processor 1002. The foregoing processor 1002 may be a general-purpose processor, a digital signal processor (DSP), an application-specific integrated circuit (ASIC), a field programmable gate array (FPGA) or another programmable logic device, a discrete gate or transistor logic device, or a discrete hardware component, and can implement or execute the methods, steps, and logical block diagrams disclosed in the embodiments of this application. The general-purpose processor may be a microprocessor, or the processor may be any conventional processor or the like. The steps of the methods disclosed in the embodiments of this application may be directly executed and completed by a hardware decoding processor, or be executed and completed by a combination of hardware and software modules in the decoding processor. A software module may be located in a mature storage medium in the field, such as a random access memory, a flash memory, a read-only memory, a programmable read-only memory or electrically erasable programmable memory, or a register. The storage medium is located in the memory 1003. The processor 1002 reads information in the memory 1003 and performs the following method steps in combination with the scheduler.

The scheduler 1001 is configured to obtain M transactions from the transaction queue, where the M transactions are transactions that perform an update on a base tree, a first transaction and a second transaction in the M transactions do not conflict, the first transaction and the second transaction are any two transactions in the M transactions, that the first transaction and the second transaction do not conflict means that a common subtree of the first transaction is neither a father nor a child of a common subtree of the second transaction, a common part that is of subtrees formed by operations performed on the base tree and that is formed by operations performed on the base tree in any transaction constitutes a common subtree of the transaction, and M is an integer greater than or equal to 2.

The processor 1002 includes at least M processor cores and has a multi-task parallel processing capability and is configured to perform reverse shallow copying in parallel for the M transactions, to generate M temporary trees corresponding to the M transactions, where a temporary tree corresponding to each transaction includes a tree that is formed after the transaction performs an update on the base tree.

The processor 1002 is further configured to merge the M temporary trees and replace the base tree with a merged temporary tree.

Optionally, the processor 1002 is specifically configured to for the first temporary tree in the M temporary trees, use the first temporary tree as a first merged tree; for the $i^{th}$ temporary tree in the M temporary trees, merge the $i^{th}$ temporary tree into an $(i-1)^{th}$ merged tree, to obtain the $i^{th}$ merged tree, where the $(i-1)^{th}$ merged tree is obtained by merging the first to the $(i-1)^{th}$ temporary trees, i is an integer, and $2 \leq i \leq M$; and use an $M^{th}$ merged tree as the merged temporary tree.

Optionally, the processor 1002 is specifically configured to for each temporary tree in the first to the $(i-1)^{th}$ temporary trees, compare a path of a common subtree of a transaction corresponding to each temporary tree with a path of a common subtree of a transaction corresponding to the $i^{th}$ temporary tree, to obtain an initial to-be-merged path of the $i^{th}$ temporary tree relative to each temporary tree; determine a shortest initial to-be-merged path as a to-be-merged path of the $i^{th}$ temporary tree relative to the $(i-1)^{th}$ merged tree; and merge the to-be-merged path into the $(i-1)^{th}$ merged tree, to obtain the $i^{th}$ merged tree.

Optionally, the scheduler 1001 is specifically configured to obtain, using a head of the transaction queue as a start point, the first to the $M^{th}$ transactions successively from the transaction queue.

Optionally, after obtaining a $(k-1)^{th}$ transaction from the transaction queue and before obtaining a $k^{th}$ transaction, the scheduler 1001 is further configured to determine that the $k^{th}$ transaction does not conflict with any transaction in the first to the $(k-1)^{th}$ transactions, where k is an integer and $2 \leq k \leq M$.

It should be noted that, in a feasible implementation, the network device does not include the scheduler 1001, and a function of the scheduler 1001 is implemented by the processor 1002.

It should be noted that this embodiment may alternatively be based on a network device that is implemented by a general physical server in combination with a Network Functions Virtualization (NFV) technology. The network device is a virtual network device, and may be a virtual machine (VM) that runs a program used for a transaction processing function. The virtual machine is deployed on a hardware device (for example, a physical server). The virtual machine is a complete software-simulated computer system that has complete hardware system functions and that runs in a completely isolated environment.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more computer-usable storage media (including but not limited to a disk memory, a CD-ROM, an optical memory, and the like) that include computer-usable program code.

The embodiments of the present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of the present disclosure without departing from the spirit and scope of this application. This application is intended to cover these modifications and variations provided that they fall within the scope of protection defined by the following claims and their equivalent technologies.

What is claimed is:

1. A transaction processing method implemented by a network device, wherein a transaction comprises a series of operations on a tree data structure, wherein the tree data structure comprises a base tree, and wherein the transaction processing method comprises:

obtaining M transactions from a transaction queue, wherein the M transactions are transactions that perform an update on a same base tree, wherein a first transaction and a second transaction are any two transactions in the M transactions that do not conflict, wherein a conflict occurs when a common subtree of the first transaction is either a father or a child of a common subtree of the second transaction, wherein a common part of subtrees formed by operations performed on the base tree in any transaction constitutes a common subtree of the transaction, and wherein M is an integer greater than or equal to two;

performing reverse shallow copying in parallel for the M transactions to generate M temporary trees corresponding to the M transactions, wherein a temporary tree corresponding to each transaction comprises a tree that is formed after the transaction performs an update on the base tree;

merging M temporary trees; and replacing the base tree with a merged temporary tree.

2. The transaction processing method of claim 1, wherein merging the M temporary trees comprises:

using a first temporary tree as a first merged tree in the M temporary trees;

merging an $i^{th}$ temporary tree into an $(i-1)^{th}$ merged tree to obtain an $i^{th}$ merged tree in the M temporary trees, wherein the $(i-1)^{th}$ merged tree is obtained by merging the first temporary tree to an $(i-1)^{th}$ temporary tree, wherein i is an integer, and wherein i is greater than or equal to two and is less than or equal to M; and using an $M^{th}$ merged tree as the merged temporary tree.

3. The transaction processing method of claim 2, wherein merging the $i^{th}$ temporary tree into the $(i-1)^{th}$ merged tree to obtain the $i^{th}$ merged tree comprises:

comparing a path of a common subtree of a transaction corresponding to each temporary tree with a path of a common subtree of a transaction corresponding to the $i^{th}$ temporary tree to obtain an initial to-be-merged path of the $i^{th}$ temporary tree relative to the temporary tree for each temporary tree in the first temporary tree to the $(i-1)^{th}$ temporary tree;

determining a shortest initial to-be-merged path as a to-be-merged path of the $i^{th}$ temporary tree relative to the $(i-1)^{th}$ merged tree; and merging the to-be-merged path into the $(i-1)^{th}$ merged tree to obtain the $i^{th}$ merged tree.

4. The transaction processing method of claim 1, wherein obtaining the M transactions from the transaction queue comprises obtaining, using a head of the transaction queue as a start point, a first transaction to an $M^{th}$ transaction successively from the transaction queue.

5. The transaction processing method of claim 4, wherein after the network device obtains a device obtains a $(k-1)^{th}$ transaction from the transaction queue and before the network device obtains $k^{th}$ transaction, the transaction processing method further comprises determining that the $k^{th}$ transaction does not conflict with any transaction in the first transaction to the $(k-1)^{th}$ transaction, wherein k is an integer, and wherein k is greater than or equal to two and is less than or equal to M.

6. The transaction processing method of claim 1, wherein the transaction comprises a read operation on the base tree in the tree data structure.

7. The transaction processing method of claim 1, wherein the transaction comprises a write operation on the base tree in the tree data structure.

8. The transaction processing method of claim 1, wherein the transaction comprises a group of update operations on different subtrees in the base tree.

9. A network device comprising:

a non-transitory computer-readable memory comprising an instruction; and a processor coupled to the non-transitory computer-readable memory and configured to execute the instruction to cause the network device to:

obtain M transactions from a transaction queue, wherein the M transactions are transactions that perform an update on a same base tree, wherein a first transaction and a second transaction are any two transactions in the M transactions that do not conflict, wherein a conflict occurs when a common subtree of the first transaction is either a father or a child of a common subtree of the second transaction, wherein a common part of subtrees formed by operations performed on the base tree in any transaction constitutes a common subtree of the transaction, and wherein M is an integer greater than or equal to two;

perform reverse shallow copying in parallel for the M transactions to generate M temporary trees corresponding to the M transactions, wherein a temporary tree corresponding to each transaction comprises a tree that is formed after the transaction performs an update on the base tree;

merge the M temporary trees; and replace the base tree with a merged temporary tree.

10. The network device of claim 6, wherein the processor is further configured to execute the instruction to cause the network device to:

use a first temporary tree as a first merged tree in the M temporary trees;

merge an $i^{th}$ temporary tree into an $(i-1)^{th}$ merged tree to obtain an $i^{th}$ merged tree, wherein the $(i-1)^{th}$ merged tree is obtained by merging the first temporary tree to an $(i-1)^{th}$ temporary tree, wherein i is an integer, and wherein i is greater than or equal to two and is less than or equal to M; and use an $M^{th}$ merged tree as the merged temporary tree.

11. The network device of claim 10, wherein the processor is further configured to execute the instruction to cause the network device to:

compare a path of a common subtree of a transaction corresponding to each temporary tree with a path of a common subtree of a transaction corresponding to the $i^{th}$ temporary tree to obtain an initial to-be-merged path of the $i^{th}$ temporary tree relative to each temporary tree for each temporary tree in the first temporary tree to the $(i-1)^{th}$ temporary tree;

determine a shortest initial to-be-merged path as a to-be-merged path of the $i^{th}$ temporary tree relative to the $(i-1)^{th}$ merged tree; and merge the to-be-merged path into the $(i-1)^{th}$ merged tree to obtain the $i^{th}$ merged tree.

12. The network device of claim 9, wherein the processor is further configured to execute the instruction to cause the network device to obtain, by using a head of the transaction queue as a start point, the first transaction to an $M^{th}$ transaction successively from the transaction queue.

13. The network device of claim 12, wherein after the processor is configured to execute the instruction to cause the network device is to obtain a $(k-1)^{th}$ transaction from the transaction queue and before the processor is configured to execute the instruction to cause the network device to obtain $k^{th}$ transaction, the processor is further configured to execute the instruction to cause the network device to determine that the $k^{th}$ transaction does not conflict with any transaction in the first transaction to the $(k-1)^{th}$ transaction, wherein k is an integer, and wherein k is greater than or equal to two and is less than or equal to M.

14. The network device of claim 9, wherein the M transactions comprise a read operation and a write operation.

15. A computer program product comprising instructions that are stored on a non-transitory computer-readable medium and that, when executed by a processor, cause a network device to: obtain M transactions from a transaction queue, wherein the M transactions are transactions that perform an update on a same base tree, wherein a first transaction and a second transaction are any two transactions in the M transactions that do not conflict, wherein a conflict occurs when a common subtree of the first transaction is either a father or a child of a common subtree of the second transaction, wherein a common part of subtrees formed by operations performed on the base tree in any transaction constitutes a common subtree of the transaction, and wherein M is an integer greater than or equal to two; perform reverse shallow copying in parallel for the M transactions to generate M temporary trees corresponding to the M transactions, wherein a temporary tree corresponding to each transaction comprises a tree that is formed after each transaction performs an update on the base tree; merge the M temporary trees; and replace the base tree with a merged temporary tree.

16. The computer program product of claim 15, wherein when executed by the processor, the instructions further cause the network device to:
   use a first temporary tree as a first merged tree in the M temporary trees;
   merge an $i^{th}$ temporary tree into an $(i-1)^{th}$ merged tree to obtain an $i^{th}$ merged tree in the M temporary trees, wherein the $(i-1)^{th}$ merged tree is obtained by merging the first temporary tree to the $(i-1)^{th}$ temporary tree, wherein i is an integer, and wherein i is greater than or equal to two and is less than or equal to M; and
   use an $M^{th}$ merged tree as the merged temporary tree.

17. The computer program product of claim 16, wherein when executed by the processor, the instructions further cause the network device to:
   compare a path of a common subtree of a transaction corresponding to each temporary tree with a path of a common subtree of a transaction corresponding to the $i^{th}$ temporary tree to obtain an initial to-be-merged path of the $i^{th}$ temporary tree relative to each temporary tree for each temporary tree in the first temporary tree to the $(i-1)^{th}$ temporary tree;
   determine a shortest initial to-be-merged path as a to-be-merged path of the $i^{th}$ temporary tree relative to the $(i-1)^{th}$ merged tree; and
   merge the to-be-merged path into the $(i-1)^{th}$ merged tree to obtain an $i^{th}$ merged tree.

18. The computer program product of claim 15, wherein when executed by the processor, the instructions further cause the network device to obtain, by using a head of the transaction queue as a start point, the first transaction to an $M^{th}$ transaction successively from the transaction queue.

19. The computer program product of claim 18, wherein when executed by the processor, the instructions further cause the network device to determine that a $k^{th}$ transaction does not conflict with any transaction in the first transaction to the $(k-1)^{th}$ transaction, wherein k is an integer, and wherein k is greater than or equal to two and is less than or equal to M.

20. The computer program product of claim 15, wherein the M transactions comprise a read operation and a write operation.

* * * * *

UNITED STATES PATENT AND TRADEMARK OFFICE
CERTIFICATE OF CORRECTION

PATENT NO. : 11,176,086 B2
APPLICATION NO. : 16/456748
DATED : November 16, 2021
INVENTOR(S) : Jie Hou et al.

Page 1 of 1

It is certified that error appears in the above-identified patent and that said Letters Patent is hereby corrected as shown below:

In the Claims

Claim 10, Column 18, Line 11: "claim 6," should read "claim 9,"

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*